United States Patent [19]
Sugiyama et al.

[11] Patent Number: 5,878,183
[45] Date of Patent: *Mar. 2, 1999

[54] DIGITAL VIDEO/AUDIO RECORDING AND REPRODUCING APPARATUS

[75] Inventors: Kazuhiro Sugiyama; Ken Onishi; Kimitoshi Hongo; Yukari Ono, all of Nagaokakyo, Japan

[73] Assignee: Mitsubishi Denki Kabushiki Kaisha, Tokyo, Japan

[*] Notice: The term of this patent shall not extend beyond the expiration date of Pat. No. 5,309,290.

[21] Appl. No.: 466,281

[22] Filed: Jun. 6, 1995

Related U.S. Application Data

[62] Division of Ser. No. 190,545, Feb. 2, 1994, Pat. No. 5,434,716, which is a continuation of Ser. No. 894,575, Jun. 5, 1992, Pat. No. 5,309,290.

[30] Foreign Application Priority Data

Jun. 7, 1991 [JP] Japan .................................. 3-136446

[51] Int. Cl.[6] .............................. H04N 5/76; H04N 5/92; G11B 5/00; G11B 5/09
[52] U.S. Cl. ............................. 386/96; 386/99; 386/101; 386/112; 360/32; 360/48; 360/64
[58] Field of Search ................................. 386/39, 40, 33, 386/96–107, 109, 111, 112; 360/18, 20, 32; H04N 5/92, 5/76, 9/79, 5/928, 9/806

[56] References Cited

U.S. PATENT DOCUMENTS

| 4,295,154 | 10/1981 | Hata et al. . |
| 4,353,098 | 10/1982 | Heinz et al. . |
| 5,012,352 | 4/1991 | Yoshimura et al. ................ 386/98 |
| 5,027,222 | 6/1991 | Shinbo et al. ...................... 386/39 |
| 5,032,927 | 7/1991 | Watanabe et al. ................. 386/101 |
| 5,130,816 | 7/1992 | Yoshio ............................... 386/99 |
| 5,175,631 | 12/1992 | Juri et al. . |
| 5,309,290 | 5/1994 | Sugiyama et al. ................. 386/101 |
| 5,311,372 | 5/1994 | Matsumi et al. ................... 386/104 |
| 5,315,445 | 5/1994 | Fukumoto et al. ................. 386/97 |
| 5,323,273 | 6/1994 | Azuma et al. ...................... 386/104 |
| 5,434,716 | 7/1995 | Sugiyama et al. ................. 386/101 |
| 5,541,739 | 7/1996 | Tanaka .............................. 386/39 |

FOREIGN PATENT DOCUMENTS

| 4104683 | 4/1992 | Japan . |
| 4238164 | 8/1992 | Japan . |
| 4307679 | 10/1992 | Japan . |

OTHER PUBLICATIONS

The Digital Television Tape Recorder–Audio and Data Recording Aspects—SMPTE Journal, Jan. 1986.
The Art of Digital Audio Watkinson by Focal Press Hoso Gijutsu (Broadcast Technology), Jul. 1988 pp. 667–672.

Primary Examiner—Thai Tran

[57] ABSTRACT

A digital video/audio recording and reproducing apparatus comprising a video signal high-efficiency encoder having a variable reduction rate, an audio signal high-efficiency encoder having a variable reduction rate, and a controller for controlling the reduction rates in both of the high-efficiency encoders. The reduction rates in both of the high-efficiency encoders are controlled in such a manner that the sum of the information amount of the video signal and that of the audio signal, after high-efficiency encoding, is maintained constant. When recording multi-channel audio signals, the reduction rates in both of the high-efficiency encoders are controlled according to the number of audio signal channels to be recorded. The high frequency components of the high-efficiency encoded video and audio signals are recorded at the end portions of recording tracks on a magnetic tape, while the low frequency components thereof are recorded in the central portion of the recording tracks.

43 Claims, 14 Drawing Sheets (CASE 1)

(CASE 2)

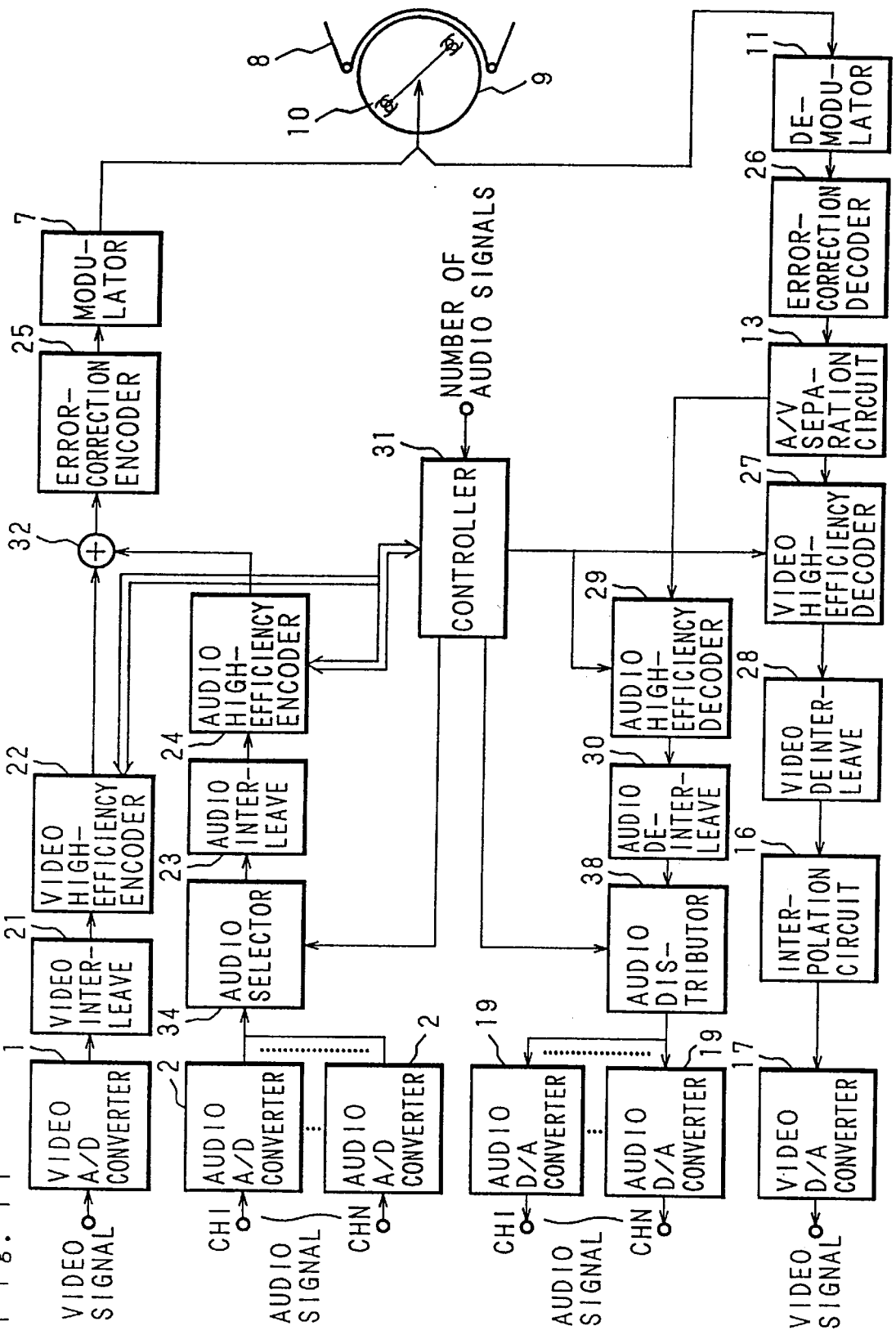

DIGITAL VIDEO/AUDIO RECORDING AND REPRODUCING APPARATUS

This application is a divisional of copending application Ser. No. 08/190,545, filed on Feb. 2, 1994, now U.S. Pat. No. 5,434,716, which was a Rule 60 continuation of Ser. No. 07/894,575, now U.S. Pat. No. 5,309,290, filed Jun. 5, 1992, the entire contents of which are hereby incorporated by reference.

BACKGROUND OF THE INVENTION

1. Field of the Invention

The present invention relates to a digital video/audio recording and reproducing apparatus for compressing and encoding digitized video and audio signals, recording the thus encoded data on a recording medium such as a magnetic tape, and reproducing the data recorded on the recording medium.

2. Description of Related Art

It is known to provide a digital video/audio recording and reproducing apparatus for digitizing video and audio signals simultaneously, recording the digitized signals on a recording medium such as a magnetic tape, magnetic disk, or optical disk, and reproducing simultaneously both the video and audio signals recorded on the recording medium for conversion into an analog representation. FIG. 1 is a block diagram showing the configuration of such a known digital video/audio recording and reproducing apparatus, disclosed in the July 1988 issue of Hosho Gijutsu (Broadcast Technology).

In FIG. 1, the numerals 1 and 2 designate a video A/D converter and an audio A/D converter, respectively, for converting an input analog video signal and an input four-channel analog audio signal into a digital representation. The video signal digitized by the video A/D converter 1 is supplied to a C2 encoder 3, which derives a C2 parity in the error-correction encoding of the video signal, appends it to the video signal, and delivers the video signal with the C2 parity to an interleave 4 where the video signal is shuffled. The audio signal digitized by the audio A/D converter 2 is supplied to an audio error-correction encoder 5 where the digitized audio signal is error-correction encoded. The video signal shuffled in the interleave 4 and the audio signal error-correction encoded by the audio error-correction encoder 5 are combined in an adder and delivered to a C1 encoder 6. The C1 encoder 6 derives a C1 parity for the combined data, appends it to the data, and delivers the data with the C1 parity to a modulator 7 where the error-correction encoded data is encoded for recording. The data encoded for recording is recorded on a magnetic tape 8 by means of a magnetic head 10 mounted on a rotating drum 9.

The reference numerals 11 to 19 indicate components comprising a reproduction system, wherein the numeral 11 designates a demodulator for decoding the replay data played back from the magnetic tape 8. The data thus decoded is directed to a C1 decoder 12 which performs error-correction based on the C1 parity word and delivers the error-corrected replay data to an A/V separation circuit 13. The A/V separation circuit 13 separates the replay data into a video signal and an audio signal and supplies the video signal to a deinterleave 14 and the audio signal to an audio error-correction decoder 18. The deinterleave 14 deshuffles the supplied video signal and delivers the deshuffled video signal to a C2 decoder 15 which performs error-correction based on the C2 parity word and delivers the error corrected video signal to an interpolation circuit 16. The interpolation circuit 16 performs interpolation on the video signal if there are any uncorrectable errors, and after processing, delivers the video signal to a video D/A converter 17 which converts the digital video signal into an analog signal for output. The audio error-correction decoder 18 performs error-correction on the supplied audio signal and delivers the error-corrected audio signal to an audio D/A converter 19 which converts the digital audio signal into an analog signal for output.

The operation of the above apparatus will now be described.

The input analog video signal is converted into a digital signal by the video A/D converter 1, and the digitized video signal is supplied to the C2 encoder 3 which appends the C2 parity for error correction. The video signal with the C2 parity is read into the interleave 4 where prescribed shuffling is performed on the video signal, after which the video signal is fed to the adder. On the other hand, the input analog audio signal is digitized by the A/D converter 2 and error-correction encoded by the audio error-correction encoder 5, after which the audio signal is fed to the adder where it is combined with the video signal. The combined data is fed to the C1 encoder 6 where the C1 parity is appended. The shuffled and error-correction encoded data is supplied to the modulator 7 which encodes it for recording. The data is now recorded on the magnetic tape 8 by means of the magnetic head 10. FIG. 2 shows the signal recording format recorded on the magnetic tape 8. The video signal and the four-channel audio signal are recorded in different areas on the same track, the audio signal being recorded outwardly of the ends of the video signal.

In the reproduction system, the digital data played back by the magnetic head 10 is fed to the demodulator 11 for decoding, after which the C1 decoder 12 performs error correction based on the C1 parity word. The output data from the C1 decoder 12 is separated into a video signal and an audio signal by the A/V separation circuit 13. The audio signal is processed by the audio error-correction decoder 18 and then converted by the audio D/A converter into a four-channnlel analog signal for sound reproduction. On the other hand, the video signal is deshuffled by the deinterleave 14 to rearrange it into the original order, after which the C2 decoder 15 performs error correction based on the C2 parity word; if there are any uncorrectable errors, error flags are attached, and the interpolation circuit 16 performs one-dimensional or two-dimensional interpolation on the video signal, the thus processed video signal then being converted by the video D/A converter 17 into an analog video signal for picture reproduction.

However, the conventional digital video/audio recording and reproducing apparatus having the above construction has the disadvantage that in order to reduce the overall size of the apparatus, if the size of the recording medium (magnetic tape) is made smaller, a shorter recording time will have to be tolerated, and if the size of the magnetic head is reduced, the recording data transfer rate (information amount) will drop, resulting in degradation in both the picture and the sound quality.

Furthermore, because of the fixed structure of the video signal recording areas and the audio signal recording areas on the recording medium (magnetic tape), as shown in FIG. 2, the maximum number of recordable audio signal channels is determined by the recording format, which gives rise to the problem that the number of audio signal channels cannot be increased beyond the predetermined maximum number; therefore, a digital video/audio recording and reproducing apparatus designed for two-channel audio recording, for example, cannot be used for recording three or more audio signal channels by using the same recording format.

Generally, in magnetic tape recording using a rotating magnetic head, the reproduction signal quality obtained from the ends of the recording tracks is inferior to that obtained from the center thereof, since errors frequently occur in the reproduction signal from the ends of the tracks. Presumably, this is because the magnetic head to magnetic tape contact characteristic is unstable at the ends of the recording tracks compared to the center thereof. In digital recording and reproducing apparatus for business use, since the recording density is set at a relatively low rate to maintain reliability, the signal quality acceptable for practical use can be obtained even from the ends of the recording tracks. However, the recording format having audio signals recorded at the ends of the tracks as shown in FIG. 2, when applied to a digital video/audio recording and reproducing apparatus designed for a higher recording density, gives rise to the problem that there occurs degradation in the sound quality since the signal quality degrades at the ends of the tracks. On the other hand, in a recording format in which the video signal recording areas are disposed at the ends of the recording tracks, degradation in the picture quality will result. Thus, the degradation of the reproduction signal quality at the ends of the tracks has the problem of causing errors in the reproduced video or audio signals.

SUMMARY OF THE INVENTION

It is an object of the present invention to provide a digital video/audio recording and reproducing apparatus having a predetermined transfer rate for signal recording and reproduction, that is, in the case of magnetic tape, for example, a predetermined tape speed and a predetermined recording density, and capable of simultaneously recording video and audio signals.

It is another object of the invention to provide a digital video/audio recording and reproducing apparatus having a predetermined transfer rate for signal recording and reproduction and capable of simultaneously recording video signals and multi-channel audio signals such as two channels, four channels, etc.

It is a further object of the invention to provide a digital video/audio recording and reproducing apparatus wherein errors occurring at the ends of the recording tracks do not lead to particularly noticeable errors in the reproduced video and audio signals, that is, as visible or audible noise in picture or sound reproduction.

In accordance with one preferred mode of the invention, there is provided a digital video/audio recording and reproducing apparatus which comprises a video signal high-efficiency encoding means having a variable reduction rate, an audio signal high-efficiency encoding means having a variable reduction rate, and a means for controlling the reduction rates in both of the high-efficiency encoding means according to the information amounts of the video and audio signals. The reduction rates in both of the high-efficiency encoding means are controlled in such a manner that the sum of the information amount of the encoded video signal and that of the encoded audio signal is maintained constant. When the information amount of the encoded video signal is smaller than that achieved by a predetermined reduction rate, the audio signal is also recorded, with a decreased reduction rate, in a recording area originally provided for recording of the video signal. On the other hand, when the information amount of the encoded audio signal is smaller than that achieved by a predetermined reduction rate, the video signal is also recorded, with a decreased reduction rate, in a recording area originally provided for recording of the audio signal. Thus, the recording medium having a limited information storing capacity is effectively utilized without leaving any recording areas unrecorded, so that the degradation of the video and audio signal quality is held to a minimum.

In another preferred mode of the invention, there is provided a digital video/audio recording and reproducing apparatus which comprises a video signal high-efficiency encoding means having a variable reduction rate, a means for selecting audio signal channels to be recorded from among a plurality of audio signal channels, and a means for controlling the reduction rate in the high-efficiency encoding means according to the number of selected audio signal channels. The reduction rate in the high-efficiency encoding means is controlled in such a manner that the sum of the information amount of the encoded video signal and that of the encoded audio signal is maintained constant. When the number of audio signal channels to be recorded increases, that is, when the amount of audio information to be recorded increases, the reduction rate in the video signal high-efficiency encoding means is raised; conversely, when the number of audio signal channels to be recorded decreases, that is, when the amount of audio information to be recorded decreases, the reduction rate in the high-efficiency encoding means is lowered. Despite the change of the number of audio signal channels to be recorded, the sum of the information amount of the encoded video signal and that of the encoded audio signal is maintained constant, so that the video signal is recorded simultaneously with the audio signal having the desired number of channels, with a minimum degradation in the picture quality. The apparatus may further include a high-efficiency encoding means for encoding the audio signal of selected channels, in which case the reduction rate in this high-efficiency encoding means is also controlled according to the number of selected audio signal channels.

In a further preferred mode of the invention, there is provided a digital video/audio recording and reproducing apparatus which comprises a vide o signal high-efficiency encoding means for performing a transform to the frequency axis for encoding, an audio signal high-efficiency encoding means for performing a transform to the frequency axis for encoding, and a sorting means for reordering the components of the encoded video and audio signals. The encoded video signal is recorded in sequence from high to low frequency components starting at one end of a recording track on magnetic tape whereas the encoded audio signal is recorded in sequence from high to low frequency components starting at the other end of the recording track. This only causes errors in reproduction in the high frequency domains of the video and audio signals, and no appreciable errors appear in the reproduced picture or sound as a whole.

The above and further objects and features of the invention will more fully be apparent from the following detailed description with accompanying drawings.

BRIEF DESCRIPTION OF THE DRAWINGS

FIG. 11 is a block diagram showing the configuration of a digital video/audio recording and reproducing apparatus according to a third embodiment of the invention.

DESCRIPTION OF THE PREFERRED EMBODIMENTS

The preferred embodiments of the present invention will now be described with reference to the accompanying drawings.

Embodiment 1

Figure 1:
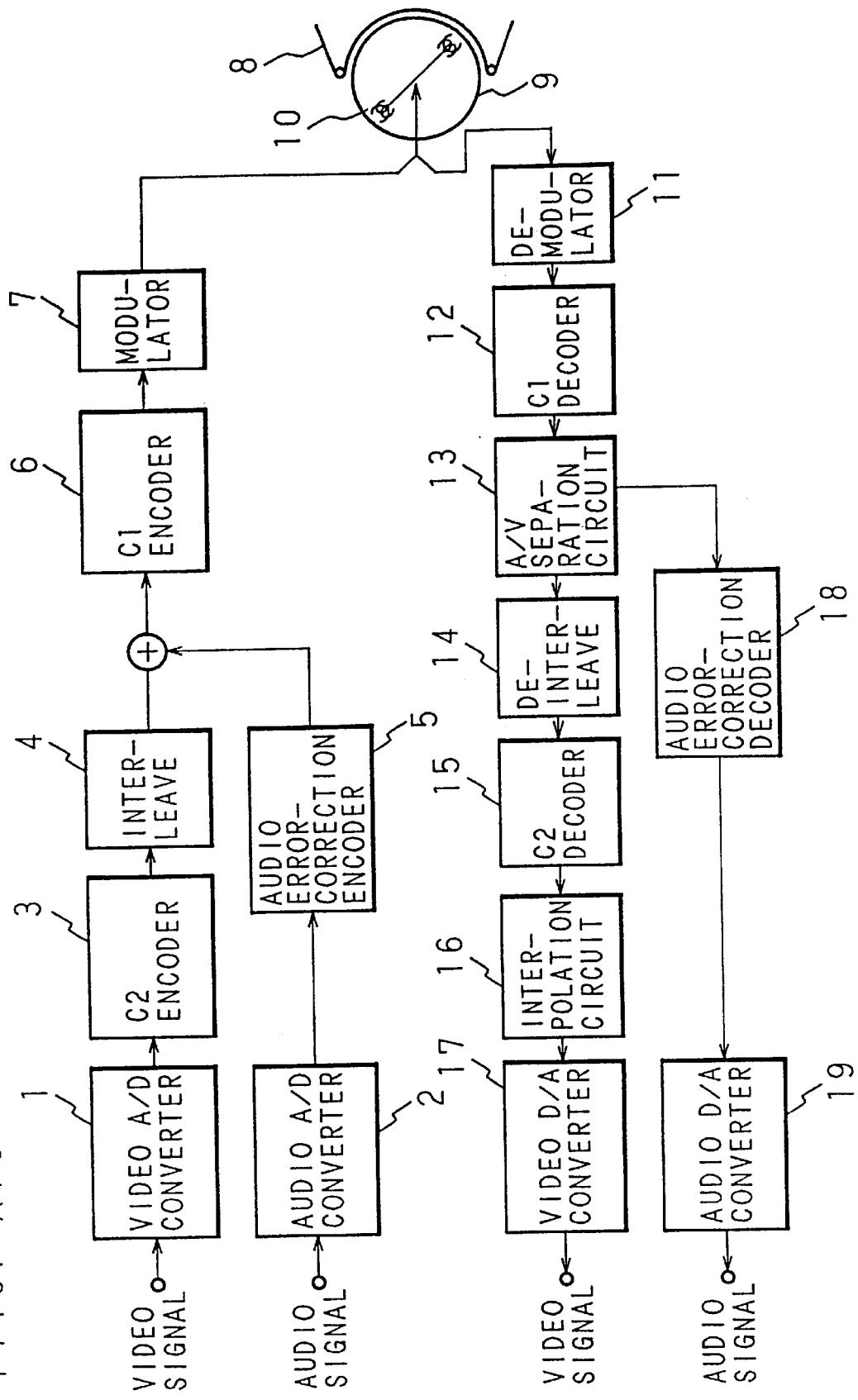
FIG. 1 is a block diagram showing the configuration of a conventional digital video/audio recording and reproducing apparatus.
Figure 2:
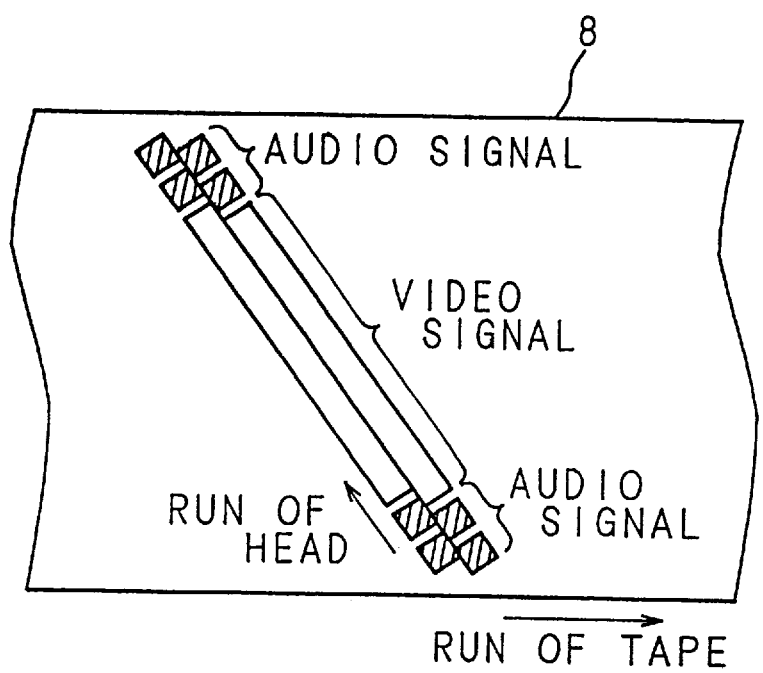
FIG. 2 is a diagram showing a recording format on a magnetic tape according to the conventional digital video/audio recording and reproducing apparatus.
Figure 3:
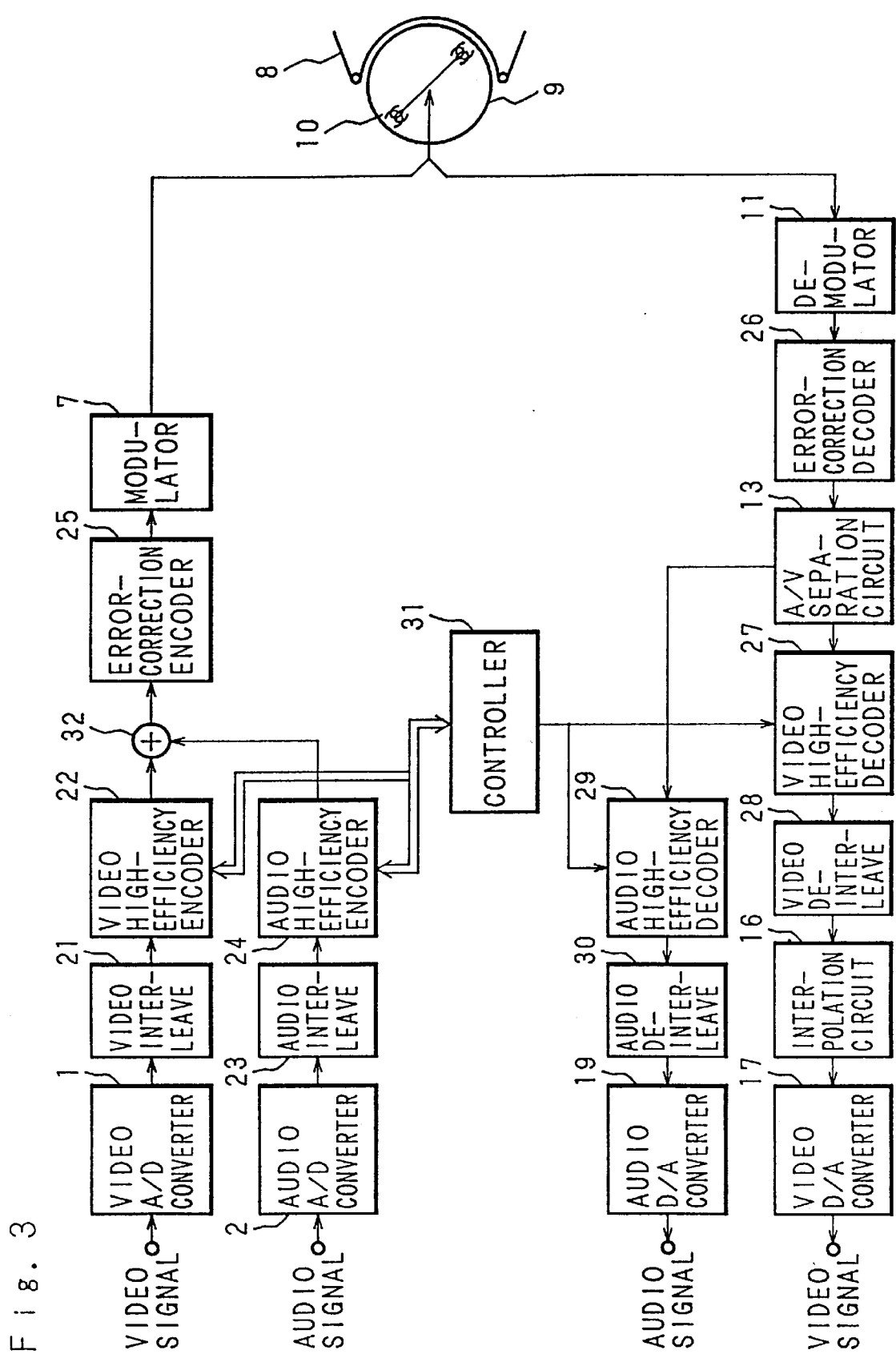
FIG. 3 is a block diagram showing the configuration of a digital video/audio recording and reproducing apparatus according to a first embodiment of the invention.

FIG. 3 is a block diagram showing the configuration of a digital video/audio recording and reproducing apparatus according to a first embodiment of the invention. The same reference numerals as used in FIG. 1 designate corresponding components. In FIG. 3, the reference numerals 1 and 2 designate a video A/D converter and an audio A/D converter, respectively, for converting an input analog video signal and an input analog audio signal into a digital representation. The video signal digitized by the video A/D converter 1 is delivered to a video interleave 21 which divides the video signal into blocks each representing a plurality of pixels and which performs shuffling on each of the blocks. The video signal read from the video interleave 21 is directed to a video high-efficiency encoder 22 where data compression is performed on each block, the compressed video signal then being delivered to an adder 32. On the other hand, the audio signal digitized by the audio A/D converter 2 is delivered to an audio interleave 23 which divides the audio signal into blocks each representing a plurality of pixels and which performs shuffling on each of the blocks. The audio signal read from the audio interleave 23 is directed to an audio high-efficiency encoder 24 where data compression is performed on each block, the compressed audio signal then being delivered to the adder 32. The adder 32 combines the encoded video signal with the encoded audio signal and supplies the combined data to an error-correction encoder 25. The error-correction encoder 25 performs error-correction encoding on the data and delivers the encoded data to a modulator 7 where the error-correction encoded data is encoded for recording. The data thus encoded for recording is recorded on a magnetic tape 8 by means of a magnetic head 10 mounted on a rotating drum 9.

In the reproduction system, the numeral 11 designates a demodulator for decoding the replay data played back from the magnetic tape 8, the data thus decoded being delivered to an error-correction decoder 26. The error-correction decoder 26 corrects errors in the video and audio signals and supplies the corrected video and audio signals to an A/V separation circuit 13. The A/V separation circuit 13 separates the supplied data into the video signal and the audio signal and directs the video signal to a video high-efficiency decoder 27 and the audio signal to an audio high-efficiency decoder 29. The video high-efficiency decoder 27 performs data expansion on the compressed video signal and delivers the expanded video signal to a video deinterleave 28 where deshuffling is performed on each of the video blocks. The video signal from the video deinterleave 28 is read into an interpolation circuit 16 which performs interpolation on the video signal in the presence of uncorrectable errors and delivers the processed video signal to a video D/A converter 17. The video D/A converter 17 converts the digital video signal into an analog representation for output. The audio high-efficiency decoder 29 performs data expansion on the compressed audio signal and delivers the expanded audio signal to an audio deinterleave 30. The audio deinterleave 30 performs deshuffling on each of the audio blocks and delivers the deshuffled audio signal to an audio D/A converter 19 which converts the digital audio signal into an analog representation for output.

The numeral 31 designates a controller for controlling the reduction rate in the video and audio high-efficiency encoders 22 and 24. An estimated amount of information is input to the controller 31 from each of the video and audio high-efficiency encoders 22 and 24, and based on this input value, the controller 31 supplies control values to the video and audio high-efficiency encoders 22, 24 and decoders 27, 29.

Figure 4:
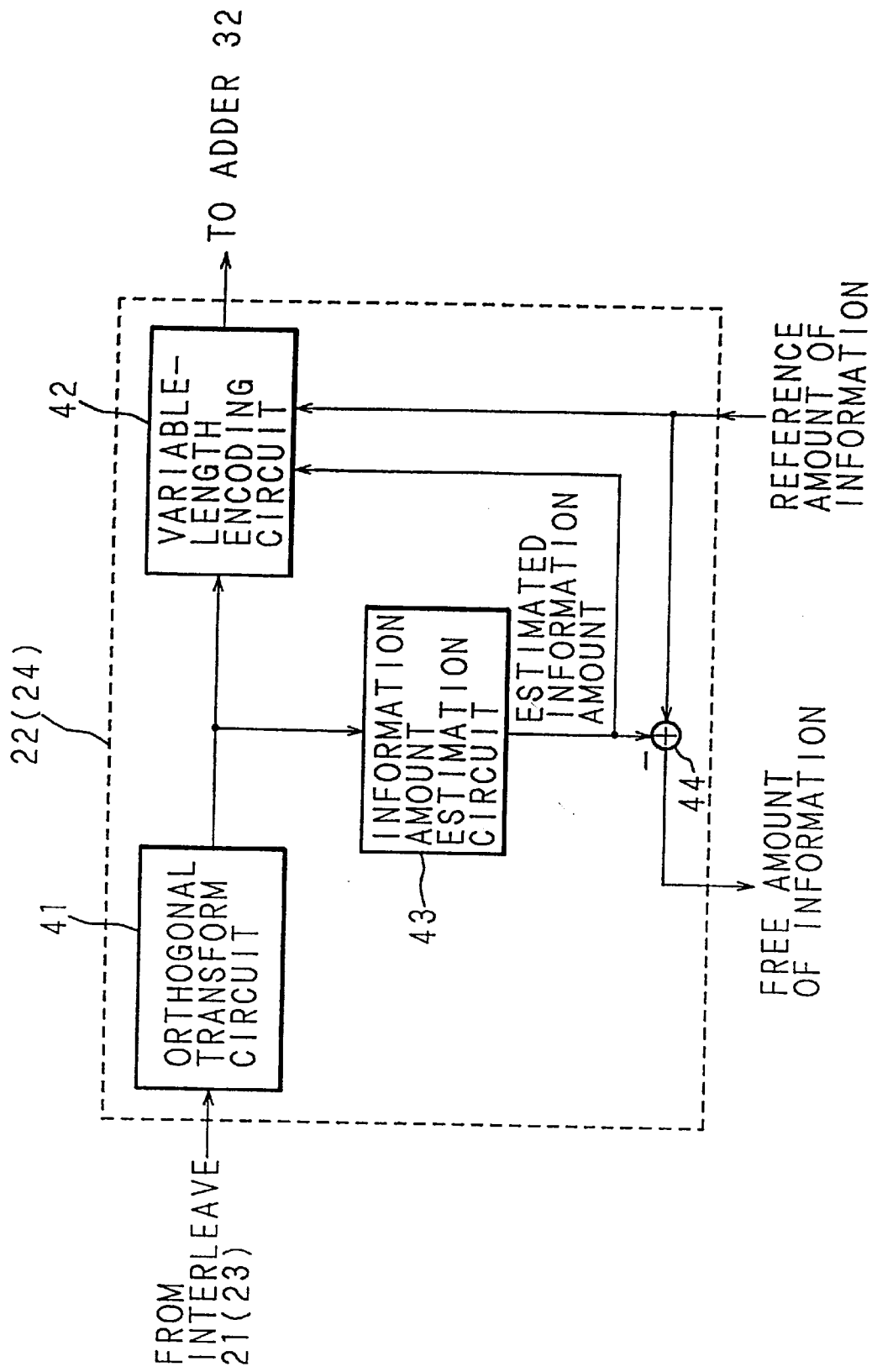
FIG. 4 is a schematic diagram showing the internal configuration of a high-efficiency encoder shown in FIG. 3.

FIG. 4 is a schematic diagram showing the internal configuration of the video high-efficiency encoder 22 (or the audio high-efficiency encoder 24) in the recording system shown in FIG. 3. As shown, the video high-efficiency encoder 22 (or the audio high-efficiency encoder 24) comprises: an orthogonal transform circuit 41 for performing an orthogonal transform, such as a discrete cosine transform (DCT), on each block of the video signal (or the audio signal); an information amount estimation circuit 43 for estimating the information amount of the video signal (or the audio signal) on the basis of transform coefficients supplied from the orthogonal transform circuit 41; a variable-length encoding circuit 42 for encoding the transform coefficients from the orthogonal transform circuit 41 to adaptively quantizing them in accordance with the estimated amount of information supplied from the information amount estimation circuit 43; and a subtractor 44 for obtaining a free amount of information by calculating the difference between the estimated information amount of the video signal (or the audio signal), given from the information amount estimation circuit 43, and the reference amount of information given from the controller 31 as a set value for the video signal (or the audio signal) information amount.

Figure 5:
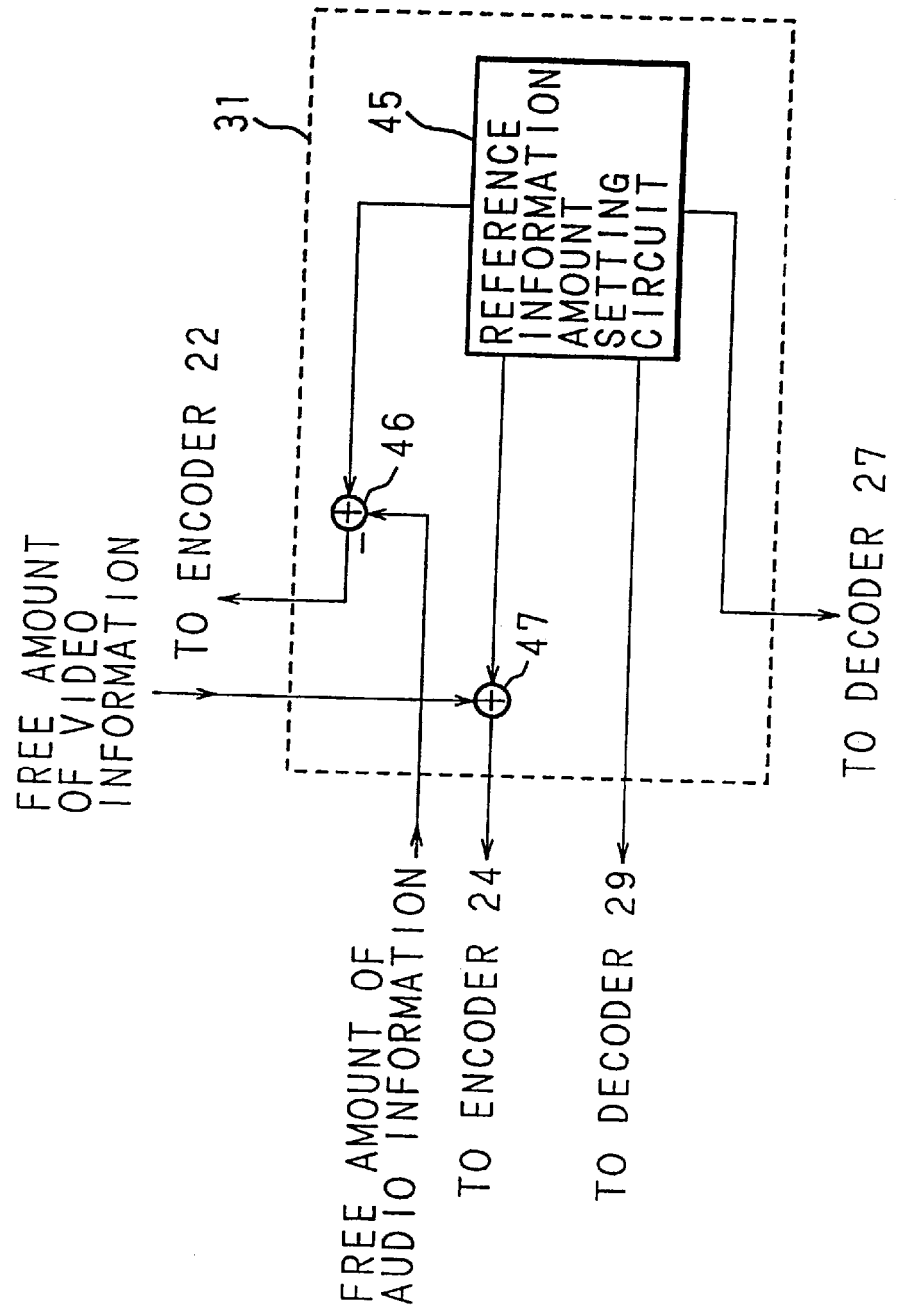
FIG. 5 is a schematic diagram showing the internal configuration of a controller shown in FIG. 3.

FIG. 5 is a schematic diagram showing the internal configuration of the controller 31. As shown, the controller 31 comprises: a reference information amount setting circuit 45 for setting the reference amounts of information for the video and audio signals; a subtractor 46 for calculating the difference between a value fed back from the audio high-efficiency encoder 24, representing the free amount of information in audio recording, and the reference amount of information for the video signal, given from the reference information amount setting circuit 45, and for feeding the difference to the video high-efficiency encoder 22; and a subtractor 47 for calculating the difference between a value fed back from the video high-efficiency encoder 22, representing the free amount of information in video recording, and the reference amount of information for the audio signal, given from the reference information amount setting circuit 45, and for feeding the difference to the audio high-efficiency encoder 24.

The operation of the apparatus will now be described below.

In the recording system, the video signal (about 100 Mbps) digitized, as in the prior art example, by the video A/D converter 1 is delivered to the video interleave 21 which divides the video signal into blocks each representing a plurality of pixels and which performs shuffling on each of the blocks. The thus divided video signal is then compressed and encoded by the video high-efficiency encoder 22. In the video high-efficiency encoder 22, an orthogonal transform is performed by the orthogonal transform circuit 41; in this case, the video signal is divided into blocks of 8 pixels×8 lines, which allows for a high reduction rate and is reasonable in terms of hardware. The shuffling by the video interleave 21 is performed in order to randomize the video signal and thereby achieve a higher degree of accuracy in the estimation of the information amount by the information amount estimation circuit 43. Since the information amount is uniformly distributed as a result of the shuffling, it is easy to estimate the entire amount of information from only a part of the information. After the orthogonal transformation by the orthogonal transform circuit 41, the variable-length encoding circuit 42, which controls the word length, i.e. the number of bits for quantizing the transform coefficients, etc., compresses the video signal in accordance with the estimated amount of information from the information amount estimation circuit 43 so that the data size is compressed to the reference amount of information set by the controller 31. The compressed video signal is then delivered to the adder 32. The information amount of the video signal after compression is, for example, about ¼ of that of the original video signal. At the same time, the free amount of information in video signal recording, which is the difference between the reference amount of video signal information set by the controller 31 and the estimated amount of information given from the information amount estimation circuit 43, is fed back to the controller 31.

On the other hand, the audio signal (about 4 Mbps) digitized by the audio A/D converter 2 is delivered to the audio interleave 23 which divides the audio signal into blocks and which performs shuffling on each of the blocks, as in the case of the video signal. The audio signal then undergoes the orthogonal transformation, information amount estimation, variable-length encoding, etc. which are performed by the audio high-efficiency encoder 24, the same processing as performed for the video signal. At the same time, as in the case of the video signal, the free amount of information in audio signal recording, which is the difference between the reference amount of audio signal information set by the controller 31 and the estimated amount of information given from the information amount estimation circuit 43, is fed back to the controller 31. The high-efficiency encoded video and audio signals are combined through the adder 32. The combined data is error-correction encoded by the error-correction encoder 25, encoded by the modulator 7 for recording, and recorded on the magnetic tape 8 by means of the magnetic head 10 mounted on the rotating drum 9.

The following describes how the controller 31 controls the amounts of information for recording. First, in the case of a four-channel audio signal, for example, the reference amounts of information are set, 24 Mbps for the video signal of 100 Mbps and 1 Mbps for the audio signal of 4 Mbps, and the thus set reference amounts of information are respectively supplied to the subtractor 46 and the video high-efficiency decoder 27 for the video signal and to the subtractor 47 and the audio high-efficiency decoder 29 for the audio signal. It is well known that the information amount of the video signal decreases greatly after compression as the image nears a static image. For example, in the above compression of the video signal from 100 Mbps to 24 Mbps, the data size may be compressed to several Mbps depending on the kinds of image. For the audio signal also, the amount of information decreases drastically for muted sections. However, since there are no correlations between the video signal and the audio signal, control is performed in the present embodiment in such a manner that when the information amount of the video signal after compression becomes smaller than the reference amount of information (predetermined reduction rate), part of the video signal recording area on the recording medium (magnetic tape 8) is freed up for recording of the audio signal with a lower reduction rate (increased information amount), and that when the information amount of the audio signal after compression becomes smaller than the reference amount of information (predetermined reduction rate), part of the audio signal recording area on the recording medium (magnetic tape 8) is freed up for recording of the video signal with a lower reduction rate (increased information amount); thus, the reduction rates in the video high-efficiency encoder 22 and the audio high-efficiency encoder 24 are controlled so that the sum of the information amount of the video signal and that of the audio signal is maintained constant when recorded. More specifically, the subtractor 46 calculates the difference between the reference amount of information for the video signal set by the reference information amount setting circuit 45 and the feedback value from the audio high-efficiency encoder 24 representing the free amount of information in audio recording, and the difference is fed to the video high-efficiency encoder 22, while on the other hand, the subtractor 47 calculates the difference between the reference amount of information for the audio signal set by the reference information amount setting circuit 45 and the feedback value from the video high-efficiency encoder 22 representing the free amount of information in video recording, and the difference is fed to the audio high-efficiency encoder 24. Thus, in this embodiment, since the reduction rates of the video and audio signals are kept as low as possible, degradation in the video and audio signal quality is minimized.

Figure 6A:
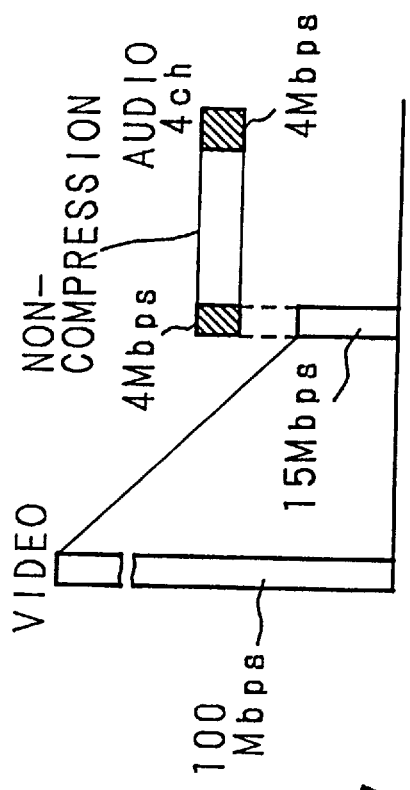
FIGS. 6(a)–6(c) are conceptual diagrams showing the amounts of information when high-efficiency encoding and data compression are performed on video and audio signals.
Figure 6B:
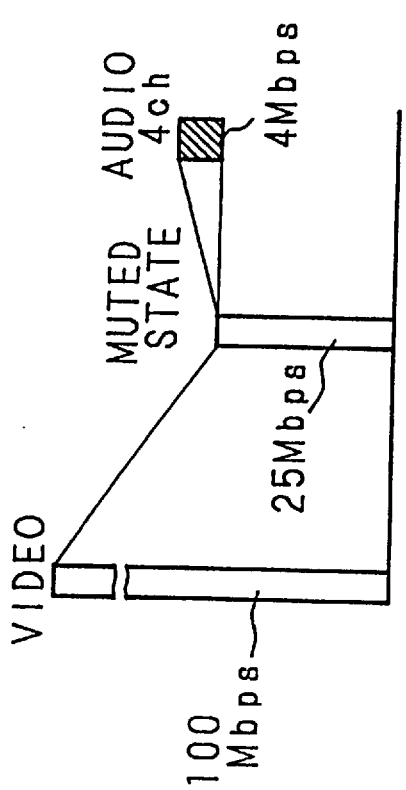
Figure 6C:
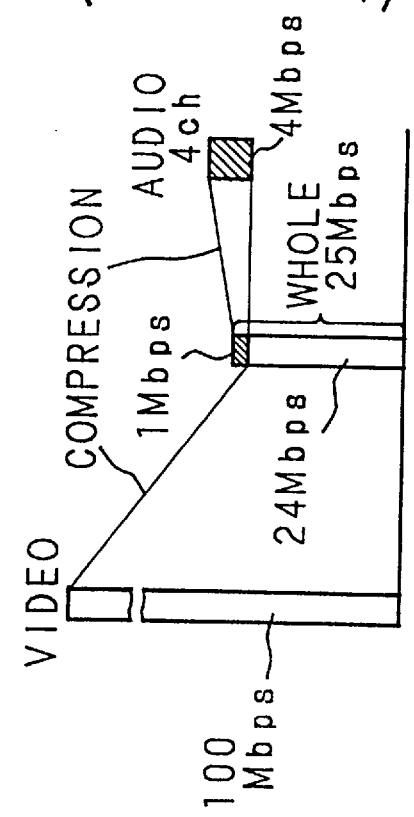

A concrete example of such reduction rate control will now be described with reference to FIG. 6. FIG. 6(a) shows the standard reduction rates (reference amounts of information) of the video and audio signals, whereby the video signal of 100 Mbps is compressed to 24 Mbps and the audio signal of 4 Mbps to 1 Mbps. FIG. 6(b) shows a case in which the information amount of the video signal after compression is smaller than the reference amount of information (for example, a static image containing a less amount of video information); in this case, the video signal is compressed from 100 Mbps to 15 Mbps, while the audio signal remains uncompressed, i.e. 4 Mbps. Since the information amount of the original video signal is small, the picture quality would be substantially the same if the video signal is compressed from 100 Mbps to 24 Mbps. FIG. 6(c) shows a case in which the information amount of the audio signal after compression is smaller than the reference amount of information (for example, a muted section containing no audio information); in this case, the audio signal is compressed from 4 Mbps to 0 Mbps, while the video signal is compressed from 100 Mbps to 25 Mbps. Thus, the reduction rate of the video signal in the video high-efficiency encoder 22 and the reduction rate of the audio signal in the audio high-efficiency encoder 24 are controlled so that any free space containing no information will not be left in the recording area capable of recording a total amount of information (25 Mbps) and so that the reduction rates are kept as low as possible in order to prevent degradation in the picture and sound quality.

Next, the operation of the reproduction system will be described. In the reproduction system, the data reproduced from the magnetic tape 8 by the magnetic head 10 is decoded by the demodulator 11 and is fed to the error-correction decoder 26 for correcting of errors such as burst errors that occurred on the magnetic tape 8. If there are uncorrectable errors, error flags are attached to the data for transfer. The error-corrected video and audio signals are separated by the A/V separation circuit 13. Next, the video high-efficiency decoder 27 expands the compressed video signal based on the reference amount of information given from the controller 31. The expanded video signal is delivered to the video deinterleave 28 where each of the video blocks is deshuffled to reconstruct the video block in its original form. Any video block containing an uncorrectable error and therefore attached with an error flag undergoes pixel interpolation through the interpolation circuit 16, and the reconstructed analog video signal is obtained from the video D/A converter 17. On the other hand, the audio signal separated by the A/V separation circuit 13 is delivered to the audio high-efficiency decoder 29 which expands the compressed audio signal on the basis of the reference amount of information given from the controller 31. The expanded audio signal is then delivered to the audio deinterleave 30 where each of the audio blocks is deshuffled to reorder the audio signal into its original form, and the recorded analog audio signal is obtained from the audio D/A converter 19.

As described above, in the first embodiment, since the reduction rates of the video and audio signals are controlled so that the sum of the information amount of the video signal and that of the audio signal, after high-efficiency encoding, is maintained constant, the video signal and the audio signal can be recorded simultaneously while minimizing degradation in the picture and sound quality.

Embodiment 2

Figure 7:
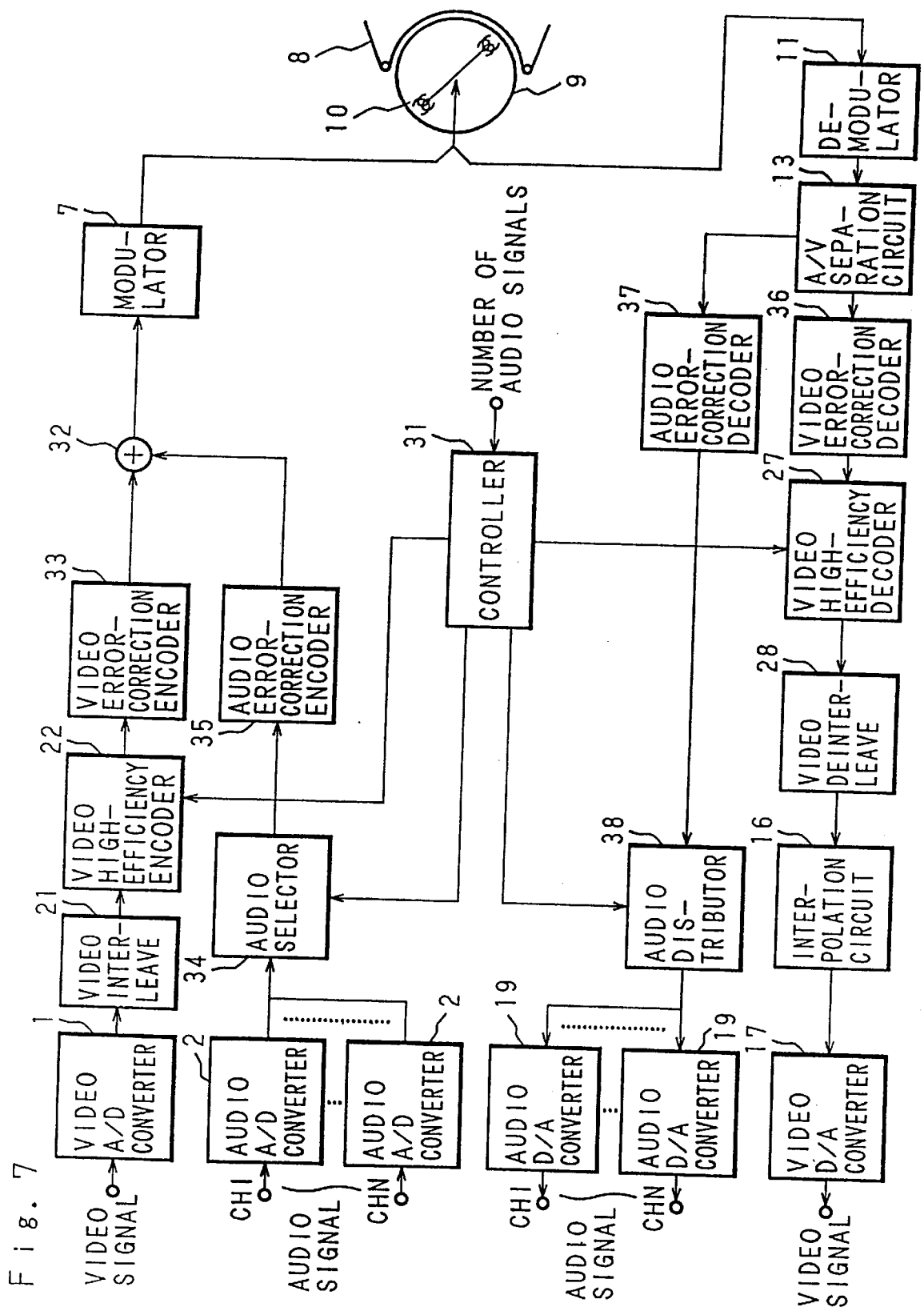
FIG. 7 is a block diagram showing the configuration of a digital video/audio recording and reproducing apparatus according to a second embodiment of the invention.

FIG. 7 is a block diagram showing the configuration of a digital video/audio recording and reproducing apparatus according to a second embodiment of the invention. In FIG. 7, the same reference numerals as used in FIG. 3 designate the same or corresponding components. In the recording system, a video error-correction encoder 33 for performing error-correction encoding of the video signal is inserted between the video high-efficiency encoder 22 and the adder 32. Also, a plurality of audio A/D converters 2 are provided, one for every one of audio channels, and between the audio A/D converters 2 and the adder 32, there are provided: an audio selector 34 for selecting from among a plurality of audio channels (N channels) the audio channels that should actually be recorded; and an audio error-correction encoder 35 for performing error-correction encoding of the audio signal. In the reproduction system, a video error-correction decoder 36 for correcting errors in the video signal is inserted between the A/V separation circuit 13 and the video high-efficiency decoder 27. Also, a plurality of audio D/A converters 19 are provided, one for every one of the audio channels, and between the audio D/A converters 19 and the A/V separation circuit 13, there are provided: an audio error-correction decoder 37 for correcting errors in the audio signal; and an audio distributor 38 for directing the reproduced audio signal to the selected output terminals (audio D/A converters 19). The numeral 31 designates a controller which controls the video high-efficiency encoder 22, the audio selector 34, the video high-efficiency decoder 27, and the audio distributor 38 in accordance with the number of selected audio signal channels.

Figure 8:
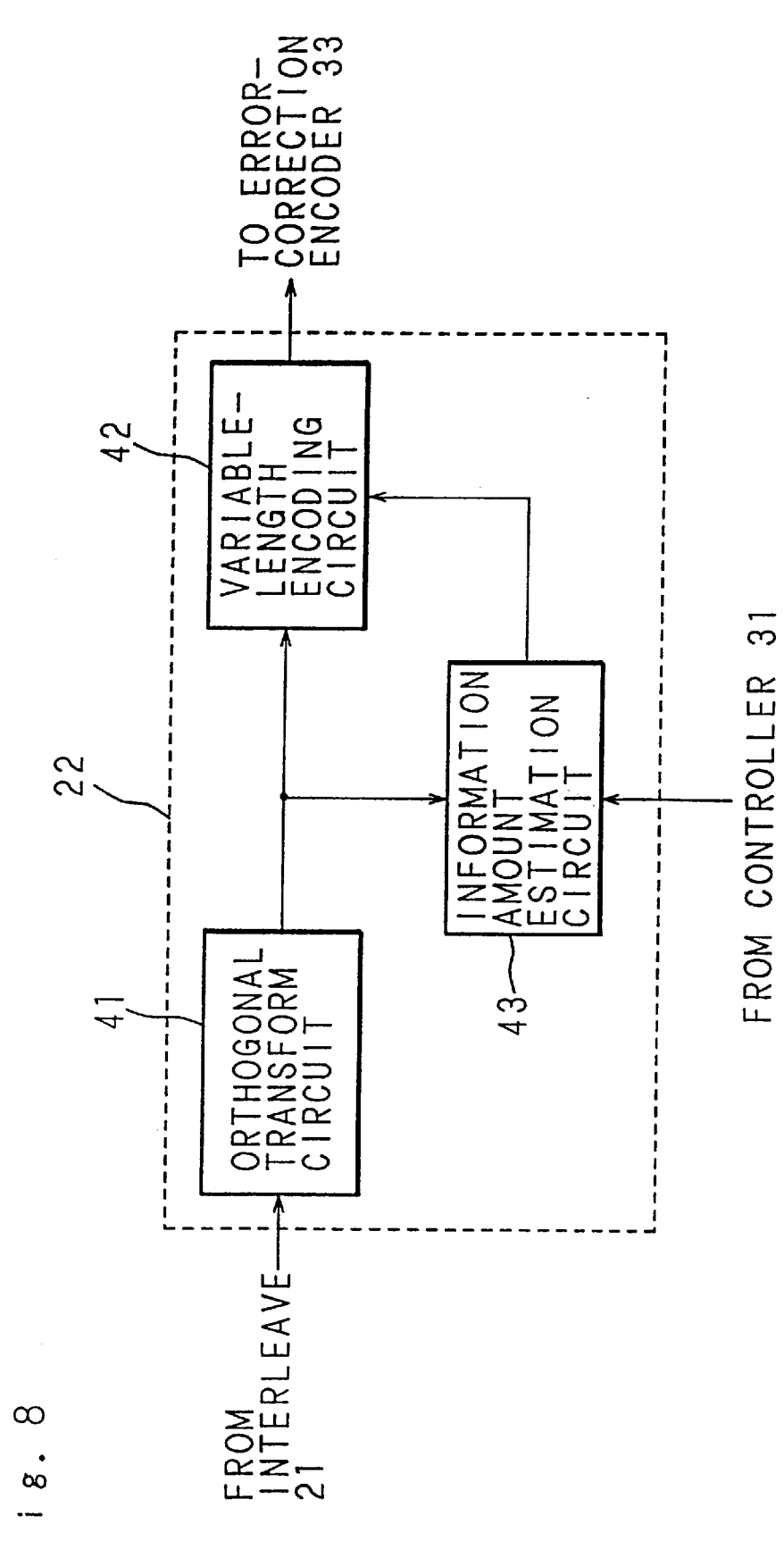
FIG. 8 is a schematic diagram showing the internal configuration of a high-efficiency encoder shown in FIG. 7.

FIG. 8 is a schematic diagram showing the internal configuration of the video high-efficiency encoder 22 in the recording system illustrated in FIG. 7. The video high-efficiency encoder 22 comprises: an orthogonal transform circuit 41 for performing an orthogonal transform, such as a DCT, on each block of the video signal; an information amount estimation circuit 43 for estimating the information amount of the video signal on the basis of transform coefficients given from the orthogonal transform circuit 41 and for supplying a control signal to a variable-length encoding circuit 42 so as to achieve the reduction rate directed by the controller 31; and the variable-length encoding circuit 42 for encoding the transform coefficients given from the orthogonal transform circuit 41 by adaptively quantizing them in accordance with the control signal given from the information amount estimation circuit 43.

Next, the operation of the apparatus will be described. In the recording system, the video signal (about 100 Mbps) digitized, as in the prior art example, by the video A/D converter 1 is delivered to the video interleave 21 where the video signal is divided into blocks each representing a plurality of pixels and shuffling is performed on each of the blocks. The thus processed video signal is compressed and encoded by the video high-efficiency encoder 22. In the video high-efficiency encoder 22, the video signal that has undergone the orthogonal transformation through the orthogonal transform circuit 41 is compressed by the variable-length encoding circuit 42, which controls the word length, i.e. the number of bits, for quantizing the transform coefficients, in accordance with the control signal given from the information amount estimation circuit 43. After error-correction encoding by the video error-correction encoder 33, the video signal is fed to the adder 32. On the other hand, from among the plurality of channels of the audio signals digitized by the audio A/D converters 2, the channels of the audio signals that should be recorded, for example, two channels or four channels, are selected by the audio selector 34. The audio signals thus selected are fed to the audio error-correction encoder 35 for error-correction encoding, after which the audio signals are fed to the adder 32 where the audio signals are combined with the video signal. The combined data is encoded by the modulator 7 for recording, and recorded on the magnetic tape 8 by means of the magnetic head 10 mounted on the rotating drum 9.

Figure 9:
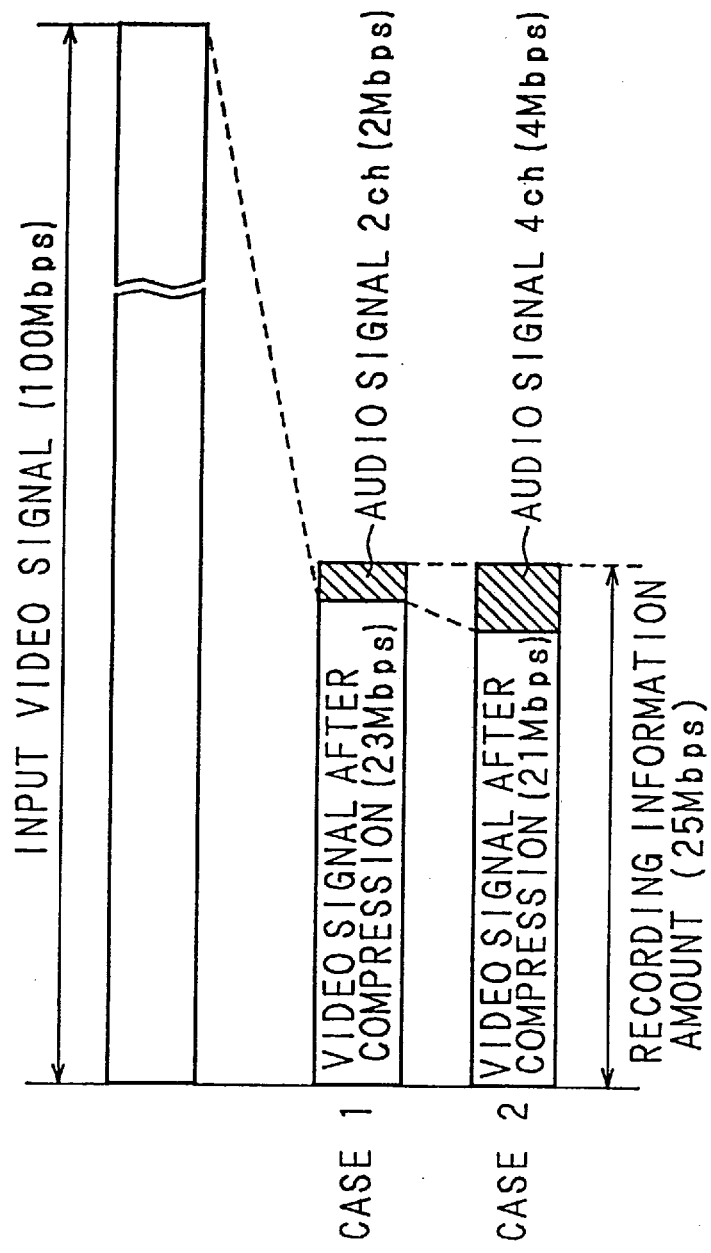
FIG. 9 is a conceptual diagram showing the amount of information when high-efficiency encoding and data compression are performed on a video signal according to the second embodiment.

In this embodiment, the input video signal of 100 Mbps is compressed for recording on the magnetic tape 8, whereas the audio signals are recorded without compression on the magnetic tape 8. FIG. 9 shows the assignment of information amounts when recording the video signal (100 Mbps)

and audio signals (two channels and four channels shown) at a fixed recording information amount of 25 Mbps. As shown, when the number of audio signal channels to be recorded increases (the audio information increases), the reduction rate in the video high-efficiency encoder 22 is raised. Conversely, when the number of audio signal channels to be recorded decreases (the audio information decreases), the reduction rate in the video high-efficiency encoder 22 is lowered. In the case of two channels (case 1), since the audio information amount is 2 Mbps when formatted for recording, the video high-efficiency encoder 22 compresses the video signal of 100 Mbps to 23 Mbps. In the case of four channels (case 2), since the audio information amount is 4 Mbps when formatted for recording, the video signal of 100 Mbps is compressed to 21 Mbps. When the number of audio signal channels are further increased, the reduction rate of the video signal is raised accordingly. Such adjustment of the reduction rate in the video high-efficiency encoder 22 is controlled by the controller 31. Since the reduction rate of the video signal is adjusted to match the change in the number of audio signal channels, as described above, any desired number of audio channels can be selected. Also, even when the number of audio channels is increased from two to four, there occurs almost no degradation in the picture quality since the reduction rate of the video signal only slightly changes, from 23/100 to 21/100.

Figure 10A:
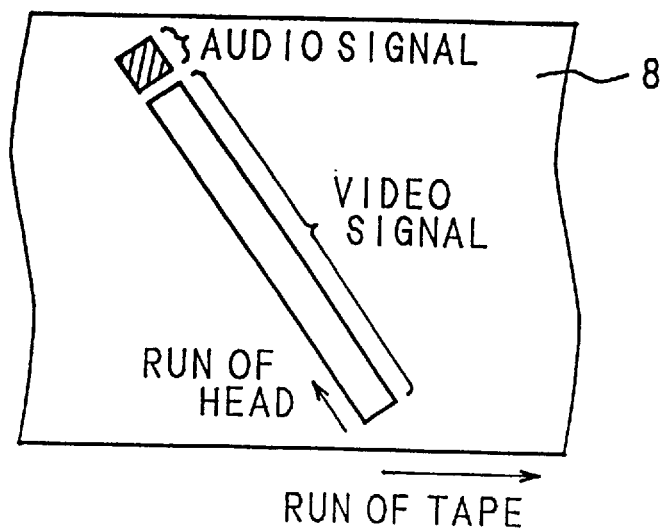
FIGS. 10(a)–10(b) are a recording format on a magnetic tape according to the second embodiment.
Figure 10B:
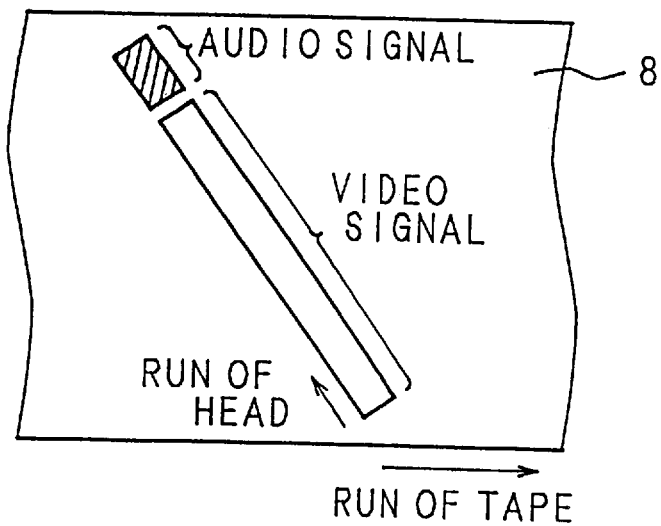

Examples of recording formats for case 1 and case 2 are shown in FIG. 10(a) and FIG. 10(b), respectively. The ratio of the audio recording area to the entire recording area changes as the number of audio channels changes. Also, since the video and audio signals are separately encoded for recording, as well as for error-correction, postrecording is possible in which only audio signals are rerecorded at a later time.

Next, the operation of the reproduction system will be described. In the reproduction system, the data reproduced from the magnetic tape 8 by the magnetic head 10 is decoded by the demodulator 11 and is separated into the video signal and the audio signal by the A/V separation circuit 13. The separated video and audio signals are supplied to the video error-correction decoder 36 and the audio error-correction decoder 37 respectively, where errors such as burst errors that occurred on the magnetic tape 8 are corrected. If there are uncorrectable errors, error flags are attached to the data for transfer. Next, the compressed video signal is expanded by the video high-efficiency decoder 27 and is delivered to the video deinterleave 28 where each of the video blocks is deshuffled to reconstruct the video block in its original form. Any video block containing an uncorrectable error and therefore attached with an error flag undergoes pixel interpolation through the interpolation circuit 16, and the reconstructed analog video signal is obtained from the video D/A converter 17. On the other hand, the audio signal after error correction is supplied to the audio distributor 38 from which the audio signal is delivered to the selected audio D/A converters 19 for reproduction of the analog audio signal.

As described above, in the second embodiment, since the reduction rate of the video signal is controlled according to the number of selected audio channels so that the sum of the information amount of the video signal and that of the selected audio signal, after high-efficiency encoding, is maintained constant, the video signal can be recorded simultaneously with the audio signal having the desired number of channels while minimizing degradation in the picture quality.

Embodiment 3

FIG. 11 is a block diagram showing the configuration of a digital video/audio recording and reproducing apparatus according to a third embodiment of the invention. In FIG. 11, the same reference numerals as used in FIGS. 3 and 7 designate the same or corresponding components. In the recording system, the audio selector 34, which selects from among a plurality of digitized audio signal channels (N channels) the audio channels that should actually be recorded, is provided between the plurality of audio A/D converters 2, provided one for every one of the audio channels, and the audio interleave 23. In the reproduction system, the audio distributor 38, which directs the reproduced audio signal to the selected output terminals (audio D/A converters 19), is provided between the audio deinterleave 30 and the plurality of audio D/A converters 19 provided one for every one of the audio channels. The controller designated by the reference numeral 31, in accordance with the number of selected audio channels, supplies a control signal to the video high-efficiency encoder 22, the audio high-efficiency encoder 24, the audio selector 34, the audio distributor 38, the video high-efficiency decoder 27, and the audio high-efficiency decoder 29, while the estimated amounts of information are fed back to the controller 31 from; the video and audio high frequency encoders 22 and 24.

Figure 12:
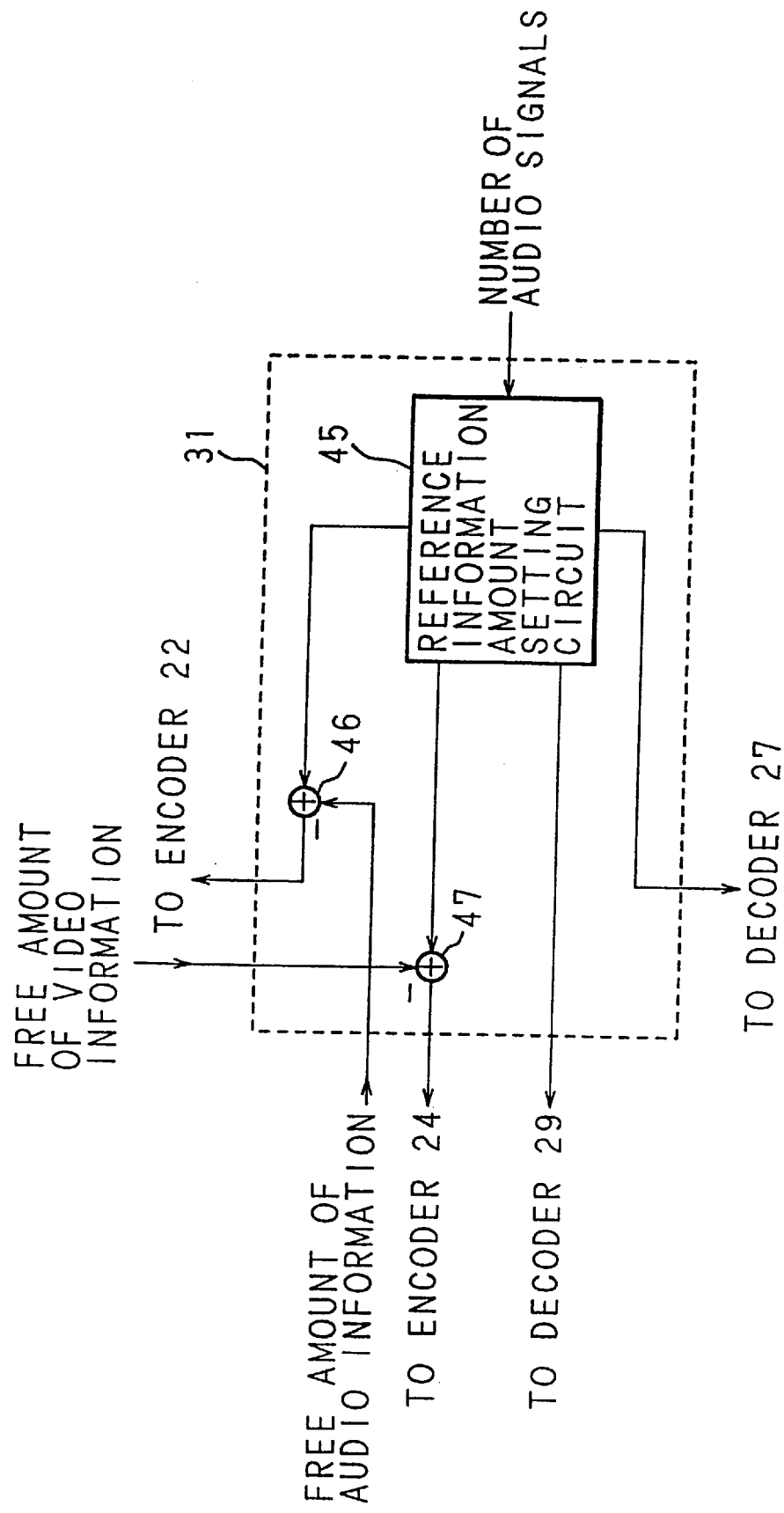
FIG. 12 is a schematic diagram showing the internal configuration of a controller shown in FIG. 11.

The internal configuration of the video high-efficiency encoder 22 (or the audio high-efficiency encoder 24) is the same as that of the first embodiment illustrated in FIG. 4. FIG. 12 is a schematic diagram showing the internal configuration of the controller 31 of this embodiment. The configuration shown is the same as that of the controller 31 of the first embodiment (see FIG. 5), except that the reference information amount setting circuit 45 sets the reference amounts of information for the video and audio signals according to the number of selected audio channels.

Next, the operation of the apparatus will be described. The operation for the recording of the video signal is the same as that described in the first embodiment and therefore, the description thereof is omitted herein. From among the plurality of channels of the audio signals digitized by the audio A/D converters 2, the channels of the audio signals that should be recorded, for example, two channels or four channels, are selected by the audio selector 34 and supplied to the audio interleave 23 which divides the audio signals into blocks and deshuffles each of the audio blocks. The thus processed audio signals are compressed by the audio high-efficiency encoder 24 and then fed to the adder 32. As in the first embodiment, the free amounts of information for the video and audio signals are fed back to the controller 31 from the video high-efficiency encoder 22 and the audio high-efficiency encoder 24, respectively. Thereafter, the video and audio signals are recorded on the magnetic tape 8 in the same manner as in the first embodiment.

The following describes how the controller 31 controls the amounts of information for recording. First, the number of selected audio channels is input to the reference information amount setting circuit 45 in the controller 31 shown in FIG. 12. The reduction rates in the video high-efficiency encoder 22 and the audio high-efficiency encoder 24 are controlled according to the number of audio channels. When the number of audio channels increases (the audio information amount increases), the reduction rates are raised; when the number of audio channels decreases (the audio information amount decreases), the reduction rates are lowered. For example, in the case of two channels, the reference amounts of information for compressing the video and audio signals are set to 24.5 Mbps for the video signal of 100 Mbps and 0.5 Mbps for the audio signal of 2 Mbps, and in the case of four channels, the reference amounts are set to 24 Mbps for the video signal of 100 Mbps and 1 Mbps for the audio signal of 4 Mbps. Depending on the kinds of the video and audio signals, the information amounts after compression may greatly decrease and become smaller than the reference amounts. In such a case, in order to keep the reduction rates of the video and audio signals as low as possible, the reduction rates in the video high-efficiency encoder 22 and audio high-efficiency encoder 24 are controlled so that the sum of the information amount of the video signal and that of the audio signal after compression is maintained constant, as in the first embodiment. The control process is the same as that described in the first embodiment (see FIG. 6), and therefore, the description thereof is omitted herein.

Next, the operation of the reproduction system will be described. The audio signal expanded by the audio high-efficiency decoder 29 is read into the audio deinterleave 30 where each of the audio blocks is deshuffled to reorder the audio signal into its original form. The audio signal is then fed to the audio distributor 38 from which it is supplied to the selected audio D/A converters 19 to reproduce the analog audio signal. Other operations are the same as in the first embodiment, and therefore, the description thereof is omitted herein.

As described, in the third embodiment, since the reduction rates of the video and audio signals are controlled according to the number of selected audio channels so that the sum of the information amount of the video signal and that of the audio signal, after high-efficiency encoding, is maintained constant, the video signal can be recorded simultaneously with the audio signal having the desired number of channels while minimizing degradation in the picture and sound quality.

In the above first, second, and third embodiments, the magnetic tape 8 is used as the recording medium, but it will be appreciated that the invention is also applicable for other recording media, such as a magnetic disk, optical disk, semiconductor memory, etc., if the same recording format is employed and the recording amount of information is fixed.

Embodiment 4

Figure 13:
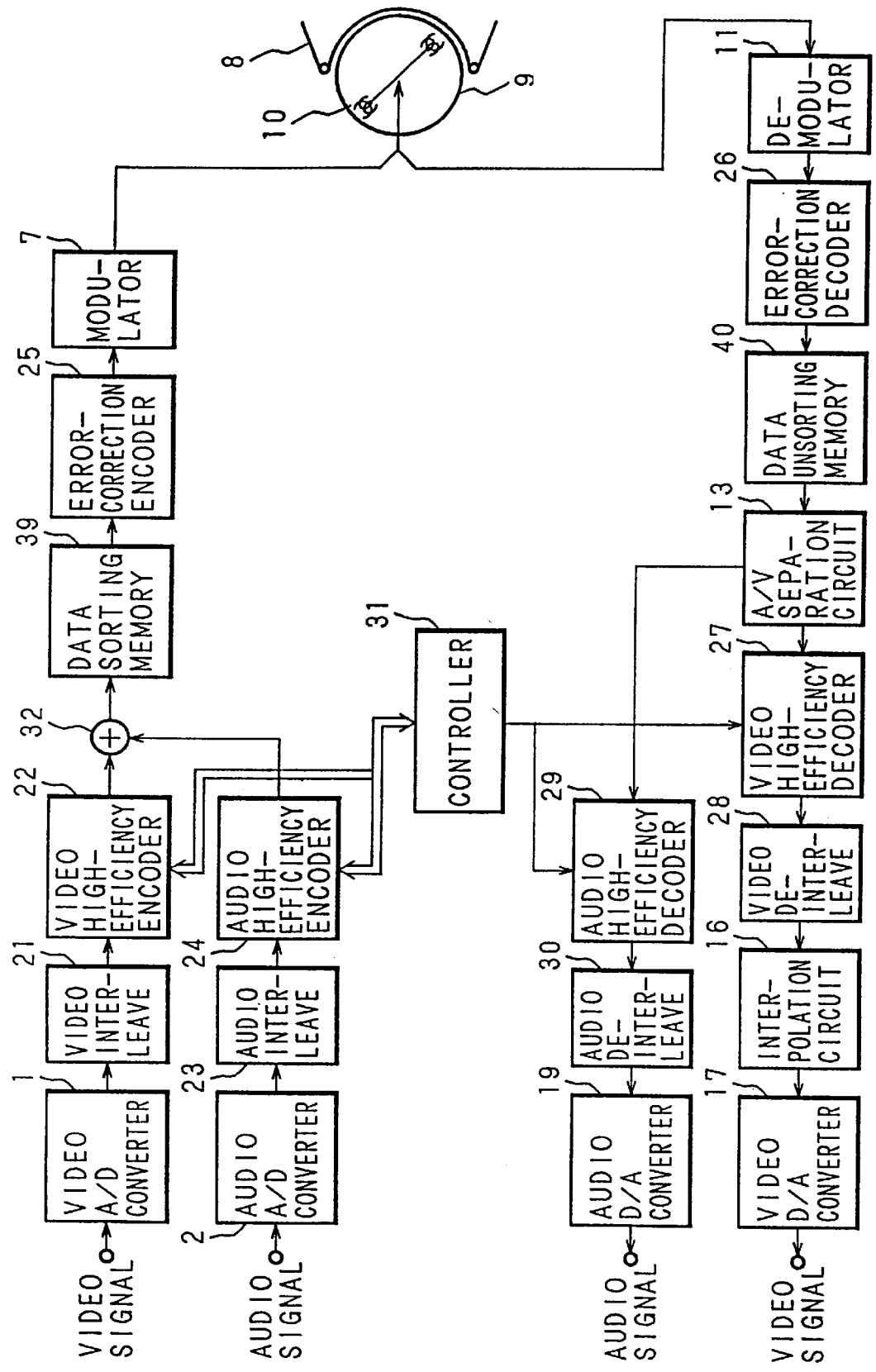
FIG. 13 is a block diagram showing the configuration of a digital video/audio recording and reproducing apparatus according to a fourth embodiment of the invention.

FIG. 13 is a block diagram showing the configuration of a digital video/audio recording and reproducing apparatus according to a fourth embodiment of the invention. In FIG. 13, the same reference numerals as used in FIG. 3 designate the same or corresponding components. In the recording system, a data sorting memory 39 for reordering the components of the video and audio signals according to their frequencies is provided between the adder 32 and the error-correction encoder 25. In the reproduction system, a data unsorting memory 40 for reordering the video and audio signals back into the original form is provided between the error-correction decoder 26 and the A/V separation circuit 13.

Next, the operation of the apparatus will be described. In this embodiment, the high frequency components of the video and audio signals are recorded at the ends of the recording tracks on the magnetic tape 8. The following description focuses on this feature of the embodiment. The high-efficiency encoded video and audio signals are combined in the adder 32 and supplied to the data sorting memory 39 which reorders the components of the encoded video signal in decreasing order of the frequency and the components of the encoded audio signal in increasing order of the frequency. The thus reordered signals are error-correction encoded by the error-correction encoder 25, processed through the modulator 7, and recorded on the magnetic tape 8 by means of the magnetic head 10.

Figure 14:
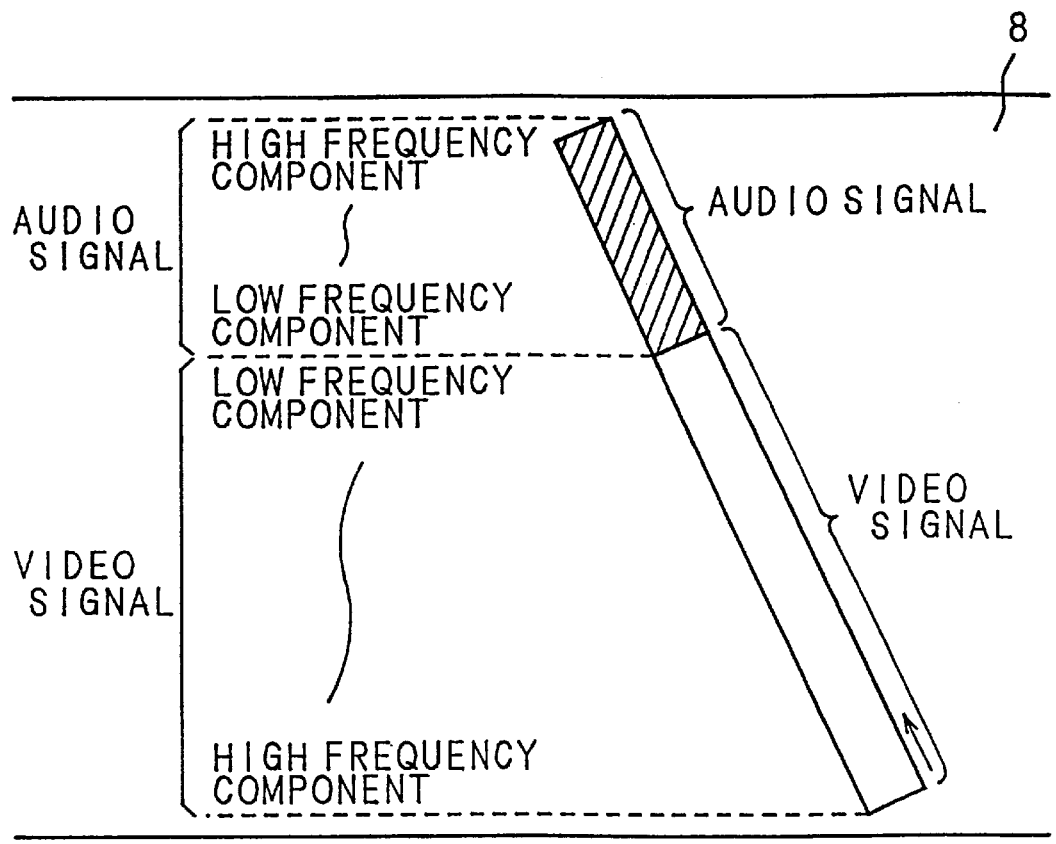
FIG. 14 is a diagram showing the arrangement pattern of a video signal and an audio signal recorded on a recording track according to the fourth embodiment.

FIG. 14 shows a recording track pattern on the magnetic tape 8 according to this embodiment. The arrow in the figure shows the helical scan direction of the rotating magnetic head 10. The magnetic head 10 helically scans the surface of the magnetic tape 8 in the arrow direction (from the bottom to the top of the magnetic tape 8) to record the video signal and the audio signal in this order. As a result, the high frequency components of the video signal are recorded at the leading end of the recording track, while at the trailing end thereof are recorded the high frequency components of the audio signal.

After error-correction by the error-correction decoder 26, the video and audio signals are fed to the data unsorting memory 40 which reorders the signals back into the original form for the subsequent expansion by the high-efficiency decoders 27 and 29. The video and audio signals are separated by the A/V separation circuit 13. Thereafter, the analog video and audio signals are reproduced for output, in the same manner as in the first embodiment. The high frequency components of the video signal mainly represent details or the contours of the image. Therefore, if the high frequency components of the video signal recorded at the leading ends of the recording tracks contain errors that cannot be completely corrected by the error-correction decoder 26, such errors are only manifested in smeared image contours, etc. and no appreciable errors appear in the image as a whole. On the other hand, the high frequency components of the audio signal represent the high frequency range of a sound. Therefore, if errors remain in the high frequency components of the audio signal recorded at the trailing ends of the recording tracks, only a slight drop in the high frequency range is caused in the reproduced sound and no appreciable errors appear in the sound as a whole.

In the above fourth embodiment, both the video and audio signals are high-efficiency encoded in a manner similar to that of the first embodiment, but it will be appreciated that for applications where high-efficiency encoding is performed on either one of the video or audio signal, the same effects as described above can be obtained for the video signal (or the audio signal) if the high frequency components of the video signal (or the audio signal) after high-efficiency encoding are recorded at one end of each recording track.

As described, in the fourth embodiment, since the high frequency components of the high-frequency encoded video and audio signals are recorded at the ends of the recording tracks on the magnetic tape, the video and audio signal can be recorded simultaneously while preventing appreciable errors from appearing in the reproduced image or sound and thus minimizing degradation in the picture and sound quality.

In the above embodiments, the orthogonal transform such as a DCT is used in performing high-efficiency encoding on the video and audio signals. However, a sub-band division method making use of a sub-band filter may be used, if the method is used, the same advantages can be obtained.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A digital video/audio reproducing apparatus for reproducing encoded signals obtained by encoding a digitized video signal and a digitized audio signal at a fixed amount of information per unit time to reproduce an original video signal and an original audio signal which were encoded by a video encoder and an audio encoder such that a sum of a varying information amount of the encoded digitized video signal and a varying information amount of the encoded digitized audio signal was maintained constant and such that the varying information amount of the encoded digitized video signal output from the video encoder was dependent on an output of the audio encoder.

2. The digital video/audio reproducing apparatus of claim 1, wherein the encoded digitized video signal and the encoded digitized audio signal are stored on one of the magnetic tape, magnetic disk, optical disk, and semiconductor memory.

3. A digital video/audio reproducing apparatus for reproducing encoded signals obtained by encoding a digitized video and a digitized audio signal at a fixed amount of information per unit time, said digital video/audio reproducing apparatus comprising:

first decoding means for expanding and decoding the encoded digitized video signal with a first variable expansion rate;

second decoding means for expanding and decoding the encoded digitized audio signal with a second variable expansion rate; and control means for controlling the first and second expansion rates in said first and said second decoding means to reproduce an original video signal and an original audio signal which were encoded by a video encoder and an audio encoder so that a sum of a varying information amount of the encoded digitized video signal and a varying information amount of the encoded digitized audio signal was maintained constant and such that the varying information amount of the encoded digitized video signal output from the video encoder was dependent on an output of the audio encoder.

4. The digital video/audio reproducing apparatus of claim 3, wherein the encoded digitized video signal and the encoded digitized audio signal are stored on one of a magnetic tape, magnetic disk, optical disk, and semiconductor memory.

5. The digital video/audio reproducing apparatus of claim 3, wherein the encoded digitized video signal and the encoded digitized audio signal were recorded so that when the information amount of the encoded digitized video signal is smaller than a reserved video information amount, the encoded digitized audio signal is recorded in a recording area originally provided for recording the encoded digitized video signal, and so that when the information amount of the encoded digitized audio signal is smaller than a reserved audio information amount, the encoded digitized video signal is recorded in a recording area originally provided for recording the encoded digitized audio signal.

6. A digital video/audio reproducing apparatus for reproducing encoded signals obtained by encoding a digitized video signal and a digitized multi-channel audio signal at a fixed amount of information per unit time, said digital video/audio reproducing apparatus comprising:

decoding means for decoding the encoded digitized video signal with a variable expansion rate;

means for identifying a number of digitized audio signals to be reproduced from the digitized multi-channel audio signal; and means for controlling the expansion rate in said decoding means according to the number of digitized audio signals to reproduce an original video signal and an original multi-channel audio signal which were encoded by a video encoder and an audio encoder so that a sum of a varying information amount of the encoded digitized video signal and a varying information amount of the number of digitized audio signals was maintained constant and such that the varying information amount of the encoded digitized video signal output from the video encoder was dependent on an output of the audio encoder.

7. The digital video/audio reproducing apparatus of claim 6, wherein the encoded digitized video signal and the number of digitized audio signals are stored on one of a magnetic tape, magnetic disk, optical disk, and semiconductor memory.

8. A digital video/audio reproducing apparatus for reproducing encoded signals obtained by encoding a digitized video signal and a digitized multi-channel audio signal at a fixed amount of information per unit time, said digital video/audio reproducing apparatus comprising:

first decoding means for expanding and decoding the encoded digitized video signal with a first variable expansion rate;

means for identifying a number of digitized audio signals to be reproduced from the encoded digitized multi-channel audio signal;

second decoding means for expanding and decoding the number of digitized audio signals with a second variable expansion rate; and control means for controlling the first and second expansion rates in said first and said second decoding means to reproduce an original video signal and an original multi-channel audio signal which were encoded by a video encoder and an audio encoder so that a sum of a varying information amount of the encoded digitized video signal and a varying information amount of the number of digitized audio signals was maintained constant and such that the varying information amount of the encoded digitized video signal output from the video encoder was dependent on an output of the audio encoder.

9. The digital video/audio reproducing apparatus of claim 8, wherein the encoded digitized video signal and the number of digitized audio signals are stored on one of a magnetic tape, magnetic disk, optical disk, and semiconductor memory.

10. The digital video/audio reproducing apparatus of claim 8, wherein the encoded digitized video signal and the number of digitized audio signals were recorded so that reduction rates of the encoded digitized video signal and encoded digitized multi-channel audio signal increase when a number of audio signal channels selected for encoding increases, and decrease when the number of audio signal channels selected for encoding decreases, so that when the information amount of the encoded digitized video signal is smaller than a reserved video information amount, the number of the audio signals selected for encoding can be recorded in a recording area originally provided for recording the encoded digitized video signal and so that when the information amount of the number of audio signals selected for encoding is smaller than a reserved audio data amount, the encoded digitized video signals can be recorded in a recording area originally provided for recording the number of audio signals selected for recording.

11. A digital video/audio reproducing apparatus comprising:

first decoding means for expanding and decoding an encoded digitized video signal with a first expansion rate;

second decoding means for expanding and decoding an encoded digitized audio signal with a second expansion rate; and control means for controlling the first and second expansion rates in said first and said second decoding means to reproduce an original video signal and an original audio signal which were encoded by a video encoder and an audio encoder so that a sum of a varying information amount of the encoded digitized video signal and a varying information amount of the encoded digitized audio signal was maintained constant and such that the varying information amount of the encoded digitized video signal output from the video encoder was dependent on an output of the audio encoder.

12. The digital video/audio reproducing apparatus of claim 11, wherein the encoded digitized video signal and the encoded audio signal are reproduced from one of a magnetic tape, magnetic disk, optical disk, and semiconductor memory.

13. The digital video/audio reproducing apparatus of claim 11, wherein the encoded digitized video signal and the encoded audio signal were recorded so that when the information amount of the encoded digitized video signal is smaller than a reserved video data amount, the encoded digitized audio signal is recorded in a recording area originally provided for recording the encoded digitized video signal, and so that when the information amount of the encoded digitized audio signal is smaller than a reserved audio data amount, the encoded digitized video signal is recorded in a recording area originally provided for recording the encoded digitized audio signal.

14. The digital video/audio reproducing apparatus of claim 11, wherein said second decoding means reproduces an original audio signal which was encoded such that the varying information amount of the encoded digitized audio signal output from the audio encoder is dependent on an output of the video encoder.

15. The digital video/audio reproducing apparatus of claim 11, wherein the varying information amount of the encoded digitized audio signal varies according to a character of the audio data.

16. The digital video/audio reproducing apparatus of claim 11, wherein the output of the audio encoder is a free amount of audio information.

17. The digital video/audio reproducing apparatus of claim 11, wherein the output of the audio encoder is a function of an estimated amount of audio information.

18. The digital video/audio reproducing apparatus of claim 11, wherein said control means limits a total combined data amount of the varying information amount of the encoded digitized audio signal and the varying information amount of the encoded digitized video signal to no more than a predetermined amount by controlling the video encoder to variably compress the varying information amount of the encoded digitized video signal, where the predetermined amount is less than a sum of a maximum audio capacity and a maximum video capacity.

19. The digital video/audio reproducing apparatus of claim 18, wherein the maximum audio capacity is less than the predetermined amount.

20. The digital video/audio reproducing apparatus of claim 18, wherein said control means limits the total combined data amount of the varying information amount of the encoded digitized audio signal and the varying information amount of the encoded digitized video signal to no more than the predetermined amount by also controlling the audio encoder to variably compress the varying information amount of the encoded digitized audio signal.

21. The digital video/audio reproducing apparatus of claim 11, wherein the varying information amount of the encoded digitized video signal varies according to a character of the video data.

22. A digital video/audio reproducing apparatus comprising:

decoding means for expanding and decoding an encoded digitized video signal with an expansion rate;

means for identifying a number of digitized audio signals to be reproduced from a multi-channel audio signal; and means for controlling the expansion rate in said decoding means according to the number of digitized audio signals, to reproduce an original video signal and an original multi-channel audio signal which were encoded by a video encoder and an audio encoder so that a sum of a varying information amount of the encoded digitized video signal and a varying information amount of the number of digitized audio signals was maintained constant and such that the varying information amount of the encoded digitized video signal output from the video encoder was dependent on an output of the audio encoder.

23. The digital video/audio reproducing apparatus of claim 22, wherein the encoded digitized video signal and the number of digitized audio signals are stored on one of a magnetic tape, magnetic disk, optical disk, and semiconductor memory.

24. The digital video/audio reproducing apparatus of claim 22, wherein the varying information amount of the encoded digitized audio signal varies according to a number of supplied audio channels.

25. A digital video/audio reproducing apparatus comprising:

first decoding means for expanding and decoding an encoded digitized video signal with a first expansion rate;

means for identifying a number of digitized audio signals to be reproduced from a multi-channel audio signal;

second decoding means for expanding and decoding the number of audio signals with a second expansion rate; and control means for controlling the first and second expansion rates in said first and said second decoding means to reproduce an original video signal and an original multi-channel audio signal which were encoded by a video encoder and an audio encoder so that a sum of a varying information amount of the encoded digitized video signal and a varying information amount of the number of digitized audio signals was maintained constant and such that the varying information amount of the encoded digitized video signal output from the video encoder was dependent on an output of the audio encoder.

26. The digital video/audio reproducing apparatus of claim 25, wherein the encoded digitized video signal and the number of audio digitized signals are stored on one of a magnetic tape, magnetic disk, optical disk, and semiconductor memory.

27. The digital video/audio reproducing apparatus of claim 25, wherein the encoded digitized video signal and the number of digitized audio signals were recorded so that reduction rates of the encoded digitized video signal and encoded digitized multi-channel audio signal increase when a number of digitized audio signal channels selected for recording increases, and decrease when the number of digitized audio signal channels selected for recording decreases, so that when the information amount of the encoded digitized video signal is smaller than a reserved video data amount, the number of the digitized audio signals selected for recording can be recorded in a recording area originally provided for recording the encoded digitized video signal and so that when the information amount of the number of digitized audio signals selected for recording is smaller than a reserved audio data amount, the encoded digitized video signal can be recorded in a recording area originally provided for recording the number of digitized audio signals selected for recording.

28. A method of reproducing encoded signals obtained by encoding a digitized video and a digitized audio signal at a fixed amount of information per unit time, said method comprising the steps of:

(a) expanding and decoding the encoded digitized video signal with a first variable expansion rate;

(b) expanding and decoding the encoded digitized audio signal with a second variable expansion rate; and (c) controlling the first and second expansion rates in said steps (a) and (b) to reproduce an original video signal and an original audio signal which were encoded by a video encoder and an audio encoder so that a sum of a varying information amount of the encoded digitized video signal a varying information amount of the encoded digitized audio signal was maintained constant and such that the varying information amount of the encoded digitized video signal output from the video encoder was dependent on an output of the audio encoder.

29. The method of claim 28, wherein the encoded digitized video signal and the encoded digitized audio signal are stored on one of a magnetic tape, magnetic disk, optical disk, and semiconductor memory.

30. The method of claim 28, wherein the encoded digitized video signal and the encoded digitized audio signal were recorded so that when the information amount of the encoded digitized video signal is smaller than a reserved video information amount, the encoded digitized audio signal is recorded in a recording area originally provided for recording the encoded digitized video signal, and so that when the information amount of the encoder digitized audio signal is smaller than a reserved audio information amount, the encoded digitized video signal is recorded in a recording area originally provided for recording the encoded digitized audio signal.

31. A method of reproducing encoded signals obtained by encoding a digitized video signal and a digitized multi-channel audio signal at a fixed amount of information per unit time, said method comprising the steps of:

(a) decoding the encoded digitized video signal with a variable expansion rate;

(b) identifying a number of digitized audio signals to be reproduced from the digitized multi-channel audio signal; and (c) controlling the expansion rate in said steps (a) and (b) according to the number of digitized audio signals to reproduce an original video signal and an original multi-channel audio signal which were encoded by a video encoder and an audio encoder so that a sum of a varying information amount of the encoded digitized video signal and a varying information amount of the number of digitized audio signals was maintained constant and such that the varying information amount of the encoded digitized video signal output from the video encoder was dependent on an output of the audio encoder.

32. The method according to claim 31, wherein the encoded digitized video signal and the number of digitized audio signals are stored on one of a magnetic tape, magnetic disk, optical disk, and semiconductor memory.

33. A method of reproducing encoded signals obtained by encoding a digitized video signal and a digitized multi-channel audio signal at a fixed amount of information per unit time, said method comprising the steps of:

(a) expanding and decoding the encoded digitized video signal with a first variable expansion rate;

(b) identifying a number of digitized audio signals to be reproduced from the encoded digitized multi-channel audio signal;

(c) expanding and decoding the number of digitized audio signals with a second variable expansion rate; and (d) controlling the first and second expansion rates in said steps (a) and (c) to reproduce an original video signal and an original multi-channel audio signal which were encoded by a video encoder and an audio encoder so that a sum of a varying information amount of the encoded digitized video signal and a varying information amount of the number of digitized audio signals was maintained constant and such that the varying information amount of the encoded digitized video signal output from the video encoder was dependent on an output of the audio encoder.

34. The method of claim 33, wherein the encoded digitized video signal and the number of digitized audio signals are stored on one of a magnetic tape, magnetic disk, optical disk, and semiconductor memory.

35. The method of claim 33, wherein the encoded digitized video signal and the number of digitized audio signals were recorded so that reduction rates of the encoded digitized video signal and encoded digitized multi-channel audio signal increase when a number of audio signal channels selected for encoding increases, and decrease when the number of audio signal channels selected for encoding decreases, so that when the information amount of the encoded digitized video signal is smaller than a reserved video information amount, the number of the audio signals selected for encoding can be recorded in a recording area originally provided for recording the encoded digitized video signal and so that when the information amount of the number of audio signals selected for encoding is smaller than a reserved audio data amount, the encoded digitized video signals can be recorded in a recording area originally provided for recording the number of audio signals selected for recording.

36. A method comprising the steps of:

(a) expanding and decoding an encoded digitized video signal with a first expansion rate;

(b) expanding and decoding an encoded digitized audio signal with a second expansion rate; and (c) controlling the first and second expansion rates in said steps (a) and (b) to reproduce an original video signal and an original audio signal which were encoded by a video encoder and an audio encoder so that a sum of a varying information amount of the encoded digitized video signal a varying information amount of the encoded digitized audio signal was maintained constant and such that the varying information amount of the encoded digitized video signal output from the video encoder was dependent on an output of the audio encoder.

37. The method of claim 36, wherein the encoded digitized video signal and the encoded audio signal are reproduced from one of a magnetic tape, magnetic disk, optical disk, and semiconductor memory.

38. The method of claim 36, wherein the encoded digitized video signal and the encoded digitized audio signal were recorded so that when the information amount of the encoded digitized video signal is smaller than a reserved video data amount, the encoded digitized audio signal is recorded in a recording area originally provided for recording the encoded digitized video signal, and so that when the information amount of the encoded digitized audio signal is smaller than a reserved audio data amount, the encoded digitized video signal is recorded in a recording area originally provided for recording the encoded digitized audio signal.

39. A method comprising the steps of:
(a) expanding and decoding an encoded digitized video signal with an expansion rate;
(b) identifying a number of digitized audio signals to be reproduced from a multi-channel audio signal; and
(c) controlling the expansion rate in said step (a) according to the number of digitized audio signals, to reproduce an original video signal and an original multi-channel audio signal which were encoded by a video encoder and an audio encoder so that a sum of a varying information amount of the encoded digitized video signal and a varying information amount of the number of digitized audio signals was maintained constant and such that the varying information amount of the encoded digitized video signal output from the video encoder was dependent on an output of the audio encoder.

40. The method of claim 39, wherein the encoded digitized video signal and the number of digitized audio signals are stored on one of a magnetic tape, magnetic disk, optical disk, and semiconductor memory.

41. A method comprising the steps of:
(a) expanding and decoding an encoded digitized video signal with a first expansion rate;
(b) identifying a number of digitized audio signals to be reproduced from a multi-channel audio signal;
(c) expanding and decoding the number of audio signals with a second expansion rate; and
(d) controlling the first and second expansion rates in said steps (a) and (c) to reproduce an original video signal and an original multi-channel audio signal which were encoded by a video encoder and an audio encoder so that a sum of a varying information amount of the encoded digitized video signal a varying information amount of the number of digitized audio signals was maintained constant and such that the varying information amount of the encoded digitized video signal output from the video encoder was dependent on an output of the audio encoder.

42. The method of claim 41, wherein the encoded digitized video signal and the encoded audio signal are reproduced from one of a magnetic tape, magnetic disk, optical disk, and semiconductor memory.

43. The method of claim 41, wherein the encoded digitized video signal and the encoded digitized audio signal were recorded so that when the information amount of the encoded digitized video signal is smaller than a reserved video data amount, the encoded digitized audio signal is recorded in a recording area originally provided for recording the encoded digitized video signal, and so that when the information amount of the encoded digitized audio signal is smaller than a reserved audio data amount, the encoded digitized video signal is recorded in a recording area originally provided for recording the encoded digitized audio signal.

* * * * *